US012534195B2

(12) United States Patent
    Zhou

(10) Patent No.: US 12,534,195 B2
(45) Date of Patent: Jan. 27, 2026

(54) AIRCRAFT, AIRCRAFT CONTROL METHOD AND DEVICE, AND COMPUTER-READABLE STORAGE MEDIUM

(71) Applicant: SZ Shanzhi Technology Co., Ltd., Shenzhen (CN)

(72) Inventor: Weixiang Zhou, Shenzhen (CN)

(73) Assignee: SZ SHANZHI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/955,591

(22) Filed: Nov. 21, 2024

(65) Prior Publication Data

US 2025/0074582 A1    Mar. 6, 2025

Related U.S. Application Data

(63) Continuation of application No. PCT/CN2022/094545, filed on May 23, 2022.

(51) Int. Cl.
    *B64C 27/52*    (2006.01)
(52) U.S. Cl.
    CPC .................................... *B64C 27/52* (2013.01)
(58) Field of Classification Search
    CPC .. B64C 29/0025; B64C 29/0033; B64C 39/12
    See application file for complete search history.

(56) References Cited

U.S. PATENT DOCUMENTS

| | | | | |
|---|---|---|---|---|
| 11,465,737 B1 * | 10/2022 | McDonald | ............. | B64D 27/34 |
| 2011/0303795 A1 | 12/2011 | Oliver | | |
| 2018/0370625 A1 * | 12/2018 | Netzer | ................ | B64C 29/0033 |
| 2019/0233077 A1 * | 8/2019 | Tian | ........................ | B64C 39/12 |
| 2022/0089279 A1 | 3/2022 | Rosen | | |
| 2022/0306292 A1 * | 9/2022 | Ross | ....................... | B64C 39/08 |

FOREIGN PATENT DOCUMENTS

| | | |
|---|---|---|
| CN | 106184737 A | 12/2016 |
| CN | 107499505 A | 12/2017 |
| CN | 208325621 U | 1/2019 |
| CN | 111169631 A | 5/2020 |
| CN | 212243812 U | 12/2020 |
| CN | 113525678 A | 10/2021 |
| CN | 214824040 U | 11/2021 |
| CN | 113788142 A | 12/2021 |

OTHER PUBLICATIONS

The World Intellectual Property Organization (WIPO) International Search Report for PCT/CN2022/094545 Dec. 28, 2022 6 Pages (including translation).

* cited by examiner

*Primary Examiner* — Nicholas McFall
*Assistant Examiner* — Terri L Filosi
(74) *Attorney, Agent, or Firm* — ANOVA LAW GROUP, PLLC

(57) ABSTRACT

An aircraft includes a vehicle body, a main wing fixedly connected to the vehicle body and configured to provide lift thrust for the aircraft, a canard arranged at the vehicle body near a nose and configured to provide lift thrust for the aircraft, and a multi-rotor assembly including a first rotor assembly mechanically coupled with the main wing and a second rotor assembly rotatably connected to the canard and configured with an adjustable tilting angle relative to the canard to provide at least one of lift thrust or forward pulling thrust for the aircraft.

19 Claims, 12 Drawing Sheets

AIRCRAFT, AIRCRAFT CONTROL METHOD AND DEVICE, AND COMPUTER-READABLE STORAGE MEDIUM

CROSS-REFERENCE TO RELATED APPLICATION

This application is a continuation of International Application No. PCT/CN2022/094545, filed on May 23, 2022, the entire content of which is incorporated herein by reference.

TECHNICAL FIELD

The present disclosure generally relates to the field of aircrafts, and, more particularly, to an aircraft, an aircraft control method and device, and a computer-readable storage medium.

BACKGROUND

Since the emergence of vertical take-off/landing aircrafts in the 1960s, they have experienced iteration and evolution of various configurations, from tilt-rotor aircrafts at the beginning to current electrical vertical take-off/landing aircrafts with a fixed-wing plus fixed-rotor configuration. Their main function and design concept is to use vertical propulsion to generate a vertical lift thrust at zero airspeed such that aircrafts are able to take off from the ground, and then to use horizontal propulsion or the thrust component of the power unit in the horizontal plane to accelerate and reach a cruising speed to maintain level flight. Therefore, a vertical take-off/landing aircraft is an aircraft that is able to take off like a helicopter and cruise like a fixed-wing aircraft.

An aircraft configuration adopted and used by existing vertical take-off/landing aircrafts is generally a conventional layout. An aircraft with the conventional layout has better stability and includes main wings and a relatively large horizontal tail. The horizontal tail of the aircraft with the conventional layout does not produce lift thrust in the cruising state, but produces a negative lift thrust to balance the aircraft. Therefore, it will increase the induced drag of the main wings, hence reducing the efficiency of level flight of the aircraft.

SUMMARY

In accordance with the disclosure, there is provided an aircraft including a vehicle body, a main wing fixedly connected to the vehicle body and configured to provide lift thrust for the aircraft, a canard arranged at the vehicle body near a nose and configured to provide lift thrust for the aircraft, and a multi-rotor assembly including a first rotor assembly mechanically coupled with the main wing and a second rotor assembly rotatably connected to the canard and configured with an adjustable tilting angle relative to the canard to provide at least one of lift thrust or forward pulling thrust for the aircraft.

Also in accordance with the disclosure, there is provided an aircraft including a vehicle body, a main wing fixedly connected to the vehicle body and configured to provide lift thrust for the aircraft, and a multi-rotor assembly including a rotor assembly configured such that, when the aircraft is in a level flight state, the rotor assembly generates a forward pulling thrust, and a side of a propeller disk plane of the rotor assembly away from the vehicle body at least partially overlaps with a projection of a wing tip of the main wing to a normal plane of a roll axis of the aircraft.

BRIEF DESCRIPTION OF THE DRAWINGS

The above and/or additional aspects and advantages of the present disclosure will become apparent and readily understood from the description of the embodiments in conjunction with the following drawings.

DETAILED DESCRIPTION OF THE EMBODIMENTS

Figure 1:
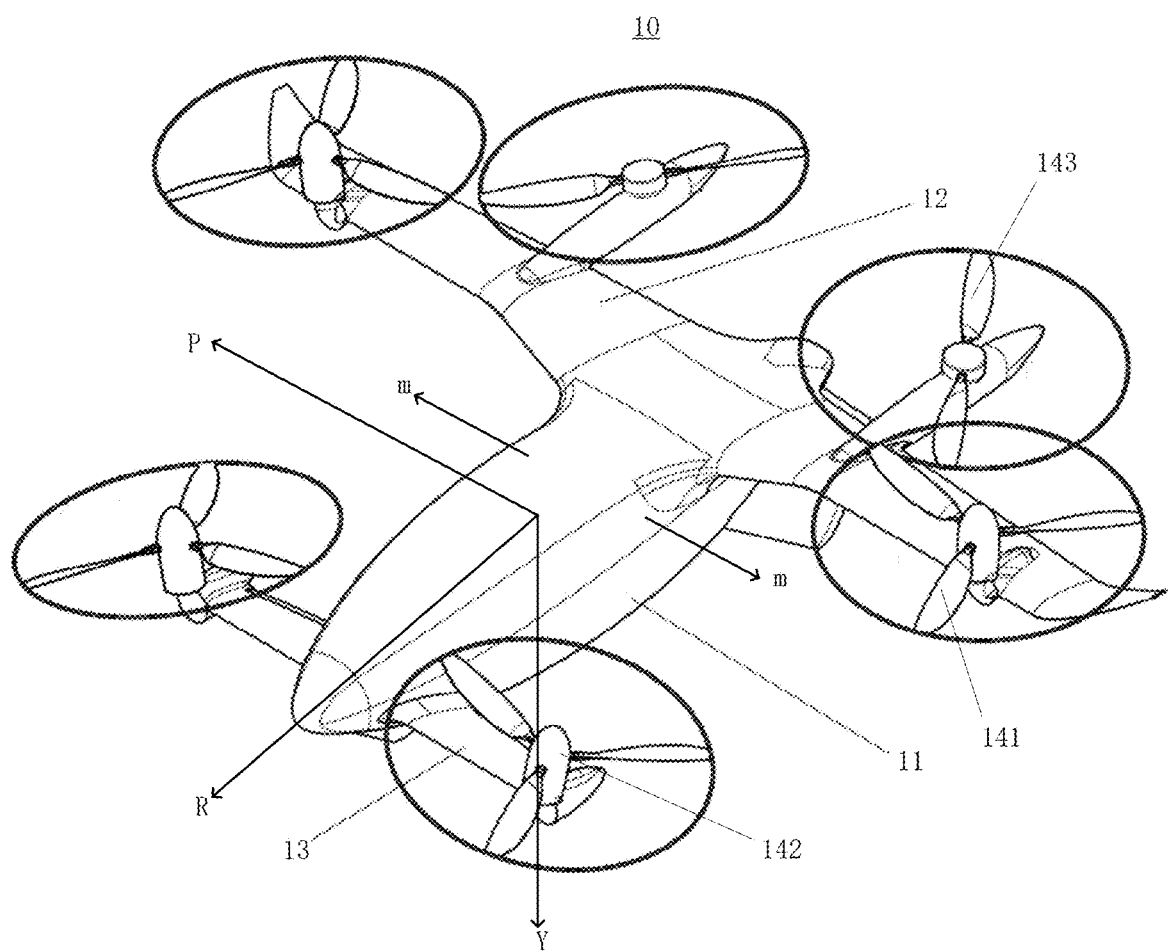
FIG. 1 is a three-dimensional view of an aircraft in a hovering state or a take-off/landing state according to some embodiments of the present disclosure.
Figure 2:
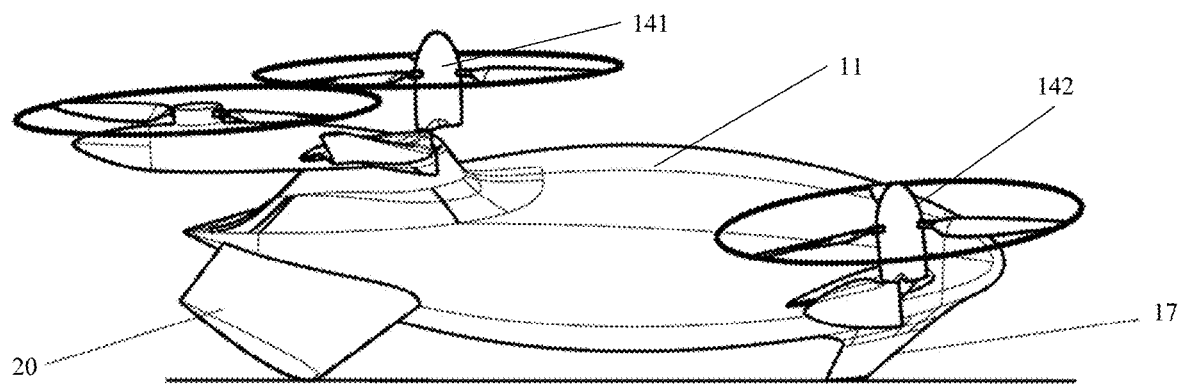
FIG. 2 is a structure schematic diagram of an aircraft before taking off according to some embodiments of the present disclosure.

Technical solutions in the embodiments of the present disclosure are hereinafter described clearly with reference to the accompanying drawings. The described embodiments are merely some, but not all, of the embodiments of the present disclosure. Based on the embodiments in the present disclosure, all other embodiments obtained by those of ordinary skill in the art without making creative efforts fall within the scope of protection of the present disclosure.

It should be understood that the terminology used in this specification is for the purpose of describing particular embodiments only and is not intended to be limiting. As used in this specification, the singular form words "a," "an," and "the" are intended to include the plural forms as well, unless the context clearly dictates otherwise.

It should be further understood that the term "and/or" as used in this specification refers to any and all possible combinations of one or more of the associated listed items and includes such combinations.

As shown in FIG. 1 to FIG. 12, the present disclosure provides an aircraft 10. The aircraft 10 may be an unmanned aircraft 10, a manned aircraft 10, a logistics aircraft 10, etc. The aircraft 10 includes a vehicle body 11; main wings 12 which are fixedly connected to the vehicle body 11 and used to provide lift thrust for the aircraft 10; canards 13 which are disposed at the vehicle body 11 close to a nose and used to provide lift thrust for the aircraft 10, and a multi-rotor assembly including first rotor assemblies 141 and second rotor assemblies 142. The first rotor assemblies 141 are mechanically coupled to the main wings 12, and the second rotor assemblies 142 are rotatably connected to the canards 13. The second rotor assemblies 142 may provide lift thrust or forward pull thrust to the aircraft 10 according to tilting angles of the second rotor assemblies 142.

Horizontal tails of a vertical take-off/landing aircraft in the prior art do not generate lift thrust in the cruising state, but generate negative lift thrust to make the aircraft calm and stable. Therefore, the induced drag of the main wings 12 will be increased, thereby reducing the horizontal flight efficiency of the aircraft 10. In the solution of the embodiments of the present disclosure, both the canards 13 with a canard layout and the main wings 12 may both generate lift thrust. Through reasonable load distribution design, the maximum lift coefficient and lift-drag ratio that are better than those of the conventional layout may be obtained. Increasing the maximum lift coefficient may reduce the transition process time and may also reduce the energy required for the transition process. Increasing the lift-to-drag ratio may increase the aircraft's range and reduce the aircraft's weight.

In some embodiments, the first rotor assemblies 141 may include motors and propellers coupled to each other, and the motors may be used to drive the propellers to rotate to provide flight control thrust for the aircraft 10.

In some embodiments, the second rotor assemblies 142 may include motors and propellers coupled to each other, and the motors may be used to drive the propellers to rotate to provide flight control thrust for the aircraft 10.

Exemplarily, the first rotor assemblies 141 may be rotatably connected to the main wings 12. The first rotor assemblies 141 may provide lift and/or forward pull thrust for the aircraft 10 according to the tilting angle of the first rotor assemblies 141.

The aircraft 10 further includes a first tilting mechanism 15, and the first rotor assemblies 141 are tiltably connected to the main wings 12 through the first tilting mechanism 15. In one embodiment, the aircraft 10 includes a second tilting mechanism 16, and the second rotor assemblies 142 are tiltably connected to the canards 13 through the second tilting mechanism 16. In the embodiments of the present disclosure, the canards 13 are fixedly connected to the vehicle body 11. The second rotor assemblies 142 are tiltable relative to the canards 13, and are rotatably connected to the canards 13 and the vehicle body 11. Compared with the solution in which the second rotor assemblies 142 are fixedly connected to the canards 13, the embodiments of the present disclosure may improve the stability of the aircraft performance and reduce the energy consumption caused by the need to tilt the canards 13 and the second rotor assemblies 142.

For example, the main wings 12 may be disposed near the tail of the vehicle body 11, and the center of gravity of the vehicle body 11 may be located between the main wings 12 and the canards 13.

The first rotor assemblies 141 may be disposed at the outer wing sections of the main wings 12, and the second rotor assemblies 142 may be disposed at the wing tips of the canards 13. The reasonable rotor rotation direction may suppress the wing tip vortex to improve the aerodynamic efficiency of the entire machine.

As shown in FIG. 1, the yaw axis (Y in the drawings), the roll axis (R in the drawings), and the pitch axis (P in the drawings) described in the present disclosure are defined in the body axis system.

When the aircraft 10 is in a take-off state, a descending state or a hovering state, the propeller disk plane of the first rotor assembly 141 may be substantially parallel to the pitch axis (P in the drawings) of the aircraft 10; and/or, the propeller disk plane of the second rotor assembly 142 may be substantially parallel to the pitch axis (P in the drawings) of the aircraft 10. In the embodiments of the present disclosure, the propeller disk plane may be a plane formed by the rotor propellers rotating when the aircraft 10 is flying. When the aircraft 10 is in the take-off state, descending state, or hovering state, the propeller disk plane of the first rotor assembly 141 may be substantially parallel to a plane formed by the pitch axis (P in the drawings) and the roll axis (R in the drawings) of the aircraft 10; and/or, the propeller disk plane of the second rotor assembly 142 may be substantially parallel to a plane formed by the pitch axis (P in the drawings) and the roll axis (R in the drawings) of the aircraft 10.

As shown in FIG. 9 to FIG. 12, when the aircraft 10 is in the level flight state, the propeller disk plane of the first rotor assembly 141 may be substantially perpendicular to the roll axis (R in the drawings) of the aircraft 10; and/or, the propeller disk plane of the second rotor assembly 142 may be substantially parallel to the pitch axis (P in the drawings) of the aircraft 10. When the aircraft 10 is in the take-off state, descending state, or hovering state, the propeller disk plane of the first rotor assembly 141 may be substantially parallel to a plane formed by the pitch axis (P in the drawings) and the roll axis (R in the drawings) of the aircraft 10; and/or, the propeller disk plane of the second rotor assembly 142 may be substantially parallel to a plane formed by the pitch axis (P in the drawings) and the roll axis (R in the drawings) of the aircraft 10.

In the embodiments of the present disclosure, the level flight state may include a horizontal flight state. When the aircraft 10 is in the level flight state, the flight speed of the aircraft 10 may be in a constant speed state or a variable speed state.

As shown in FIG. 1 to FIG. 5, when the aircraft 10 is in the take-off state, the descending state or the hovering state, the tilting angle of the first rotor assemblies 141 is a preset upper limit angle of the tilting angle of the first rotor assemblies 141; and/or, the tilting angle of the second rotor assemblies 142 is the preset upper limit angle of the tilting angle of the second rotor assemblies 142.

When the aircraft 10 is in the take-off state, the descending state or the hovering state, the tilting angle of the first rotor assemblies 141 is a preset lower limit angle of the tilting angle of the first rotor assemblies 141; and/or, the tilting angle of the second rotor assemblies 142 is the preset lower limit angle of the tilting angle of the second rotor assemblies 142.

In some embodiments of the present disclosure, the tilting angle may be the angle of the first rotor assemblies 141 or the second rotor assemblies 142 relative to the pitch axis (P in the drawings) of the aircraft 10.

The preset upper limit angle and the preset lower limit angle may be the two limit end points of the tilting angle, that is, the first rotor assemblies 141 and/or the second rotor assemblies 142 may be only able to rotate between the two limit points. For example, when the tilting angle of the first rotor assemblies 141 is between 0 and 90 degrees, the preset upper limit angle of the tilting angle of the first rotor assemblies 141 is 0 degrees, and the preset lower limit angle is 90 degrees. The preset upper limit angle of the tilting angle of the first rotor assemblies 141 may be the same as or different from the preset upper limit angle of the tilting angle of the second rotor assemblies 142. The preset lower limit angle of the tilting angle of the first rotor assemblies 141 may be the same as or different from the preset lower limit angle of the tilting angle of the second rotor assemblies 142.

Figure 6:
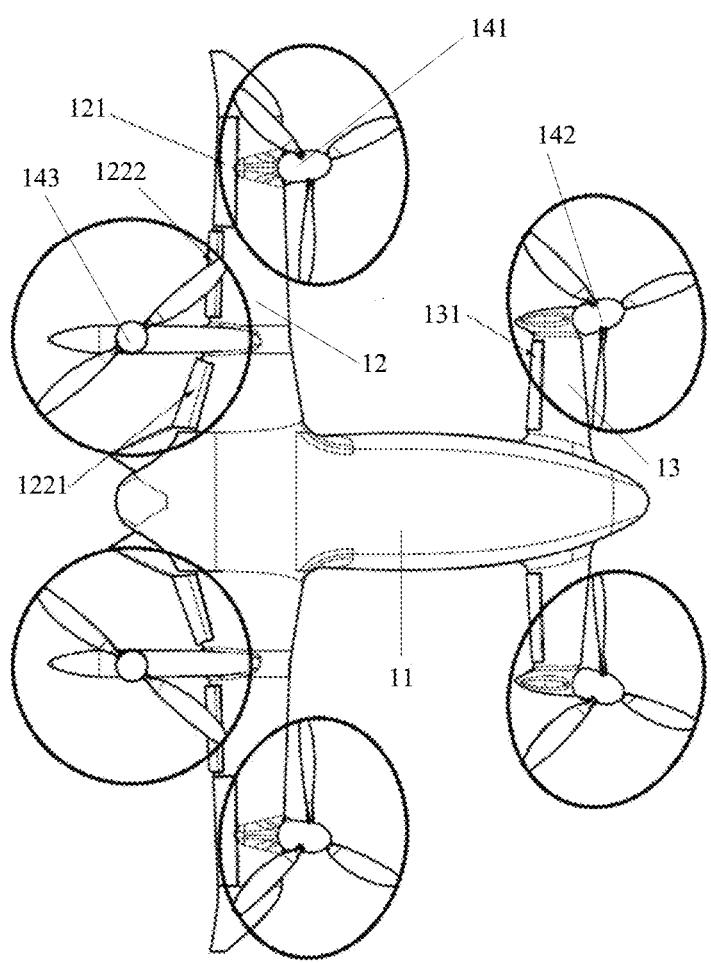
FIG. 6 is a top view of an aircraft in a first transitional state or in a second transitional state according to some embodiments of the present disclosure.
Figure 7:
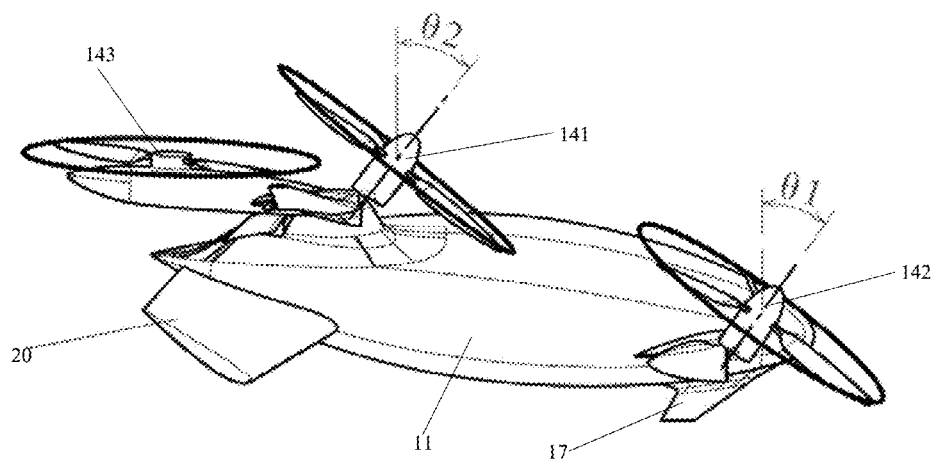
FIG. 7 is a left view of an aircraft in a first transitional state or in a second transitional state according to some embodiments of the present disclosure.
Figure 8:
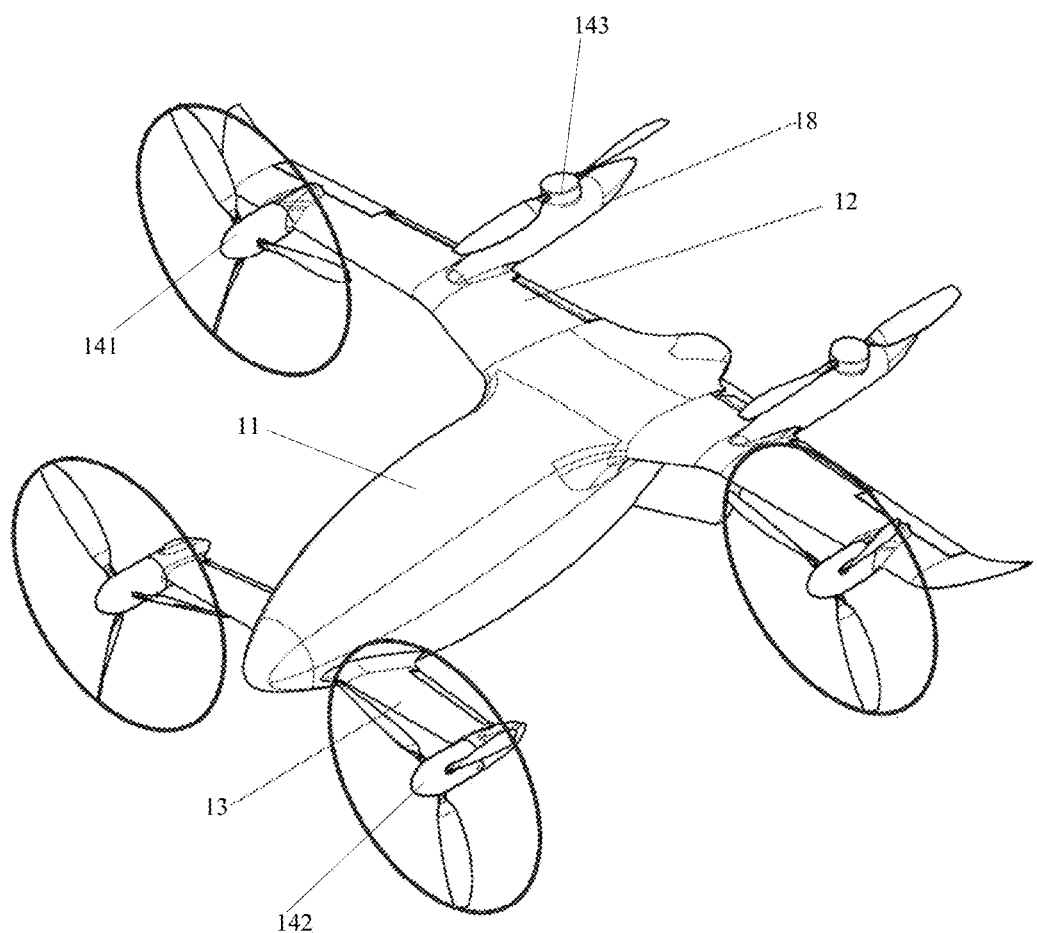
FIG. 8 is a three-dimensional view of an aircraft in a first transitional state or in a second transitional state according to some embodiments of the present disclosure.
Figure 9:
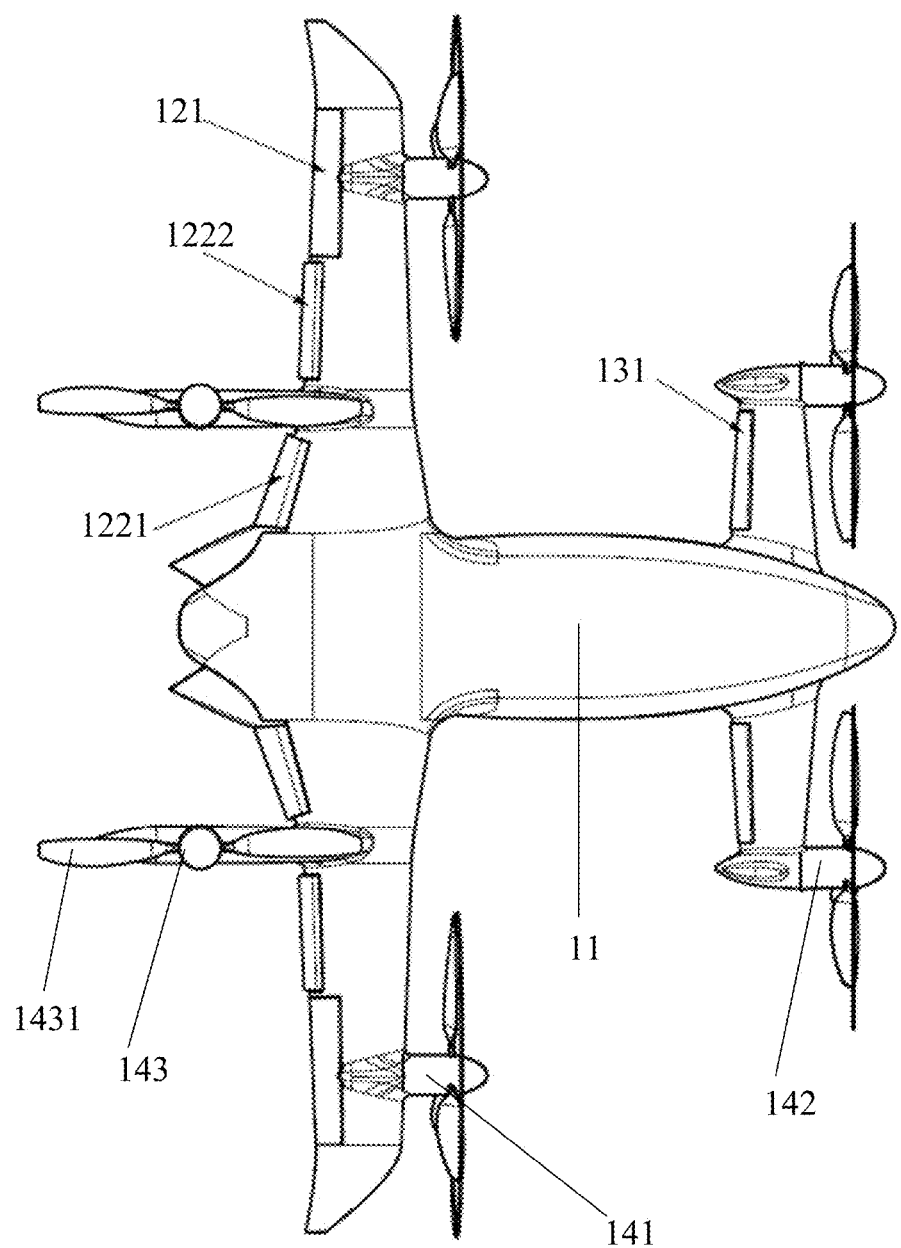
FIG. 9 is a top view of an aircraft in a level flight state according to some embodiments of the present disclosure.

As shown in FIG. 6 to FIG. 8, when the aircraft 10 transitions from the first flight state to the second flight state, the tilting angle of the first rotor assemblies 141 and the tilting angle of the second rotor assemblies 142 switch from an equal state to an unequal state. For example, when the aircraft 10 transitions from the first flight state to the second flight state, the tilting angle of the first rotor assemblies 141 and the tilting angle of the second rotor assemblies 142 change from an equal state to an unequal state. For another example, when the aircraft 10 transitions from the hovering state to the level flight state, the tilting angle of the first rotor assemblies 141 and the tilting angle of the second rotor assemblies 142 switch from an equal state to an unequal state. The difference between the first flight state and the second flight state may include one or more of a difference in flight speed, a difference in flight altitude, a difference in flight conditions, or a difference in flight attitude.

At one moment when the aircraft 10 has a horizontal forward flight speed, the difference between the tilting angle of the first rotor assemblies 141 and the tilting angle of the second rotor assemblies 142 may be larger than zero.

The multi-rotor assembly further includes third rotor assemblies 143, and the third rotor assemblies 143 may be connected to the vehicle body 11 or the main wings 12. The third rotor assemblies 143 may include motors and propellers coupled to each other. The motors are used to drive the propellers to rotate to generate thrust acting on the aircraft 10.

Each of the first rotor assemblies 141, the second rotor assemblies 142 and the third rotor assemblies 143 may include two rotor members symmetrically distributed.

The first rotor assemblies 141 may be installed on a side of the main wings 12 near the nose; and the third rotor assemblies 143 may be installed on another side of the main wings 12 near the tail.

The propeller disk plane of the third rotor assembly 143 may be located above the main wings 12 or the vehicle body 11, reducing the risk of injury caused by the propeller disk plane being located below the main wings 12 or the vehicle body 11.

When the aircraft 10 is in the take-off state, the descending state or the hovering state, the propeller disk plane of the third rotor assembly 143 may be parallel to the vehicle body 11, and the third rotor assemblies 143 may be in a working state. In the embodiments of the present disclosure, the layout of six rotor assemblies may effectively resist the power imbalance problem caused by the failure of a single engine. After any engine failure, it may be ensured that the entire aircraft has capabilities to complete level flight and hovering. In the transitional state, switching to a hover configuration may be achieved immediately for a vertical landing in response to a single engine failure.

When the aircraft 10 is in the level flight state, the third rotor assemblies 143 may be in a stalled state. In the embodiments of the present disclosure, by controlling the third rotor assemblies 143 to be in the stalled state for the level flight state, forward flight power redundancy may be reduced and the endurance of the aircraft 10 may be improved.

When the aircraft 10 is in the level flight state, the blades of the third rotor assemblies 143 may extend along the roll axis direction of the aircraft 10. When the blades extend along the direction of the roll axis (R in the illustration) of the aircraft 10, they may be kept in a phase along the airflow to reduce the resistance of forward flight.

Figure 12:
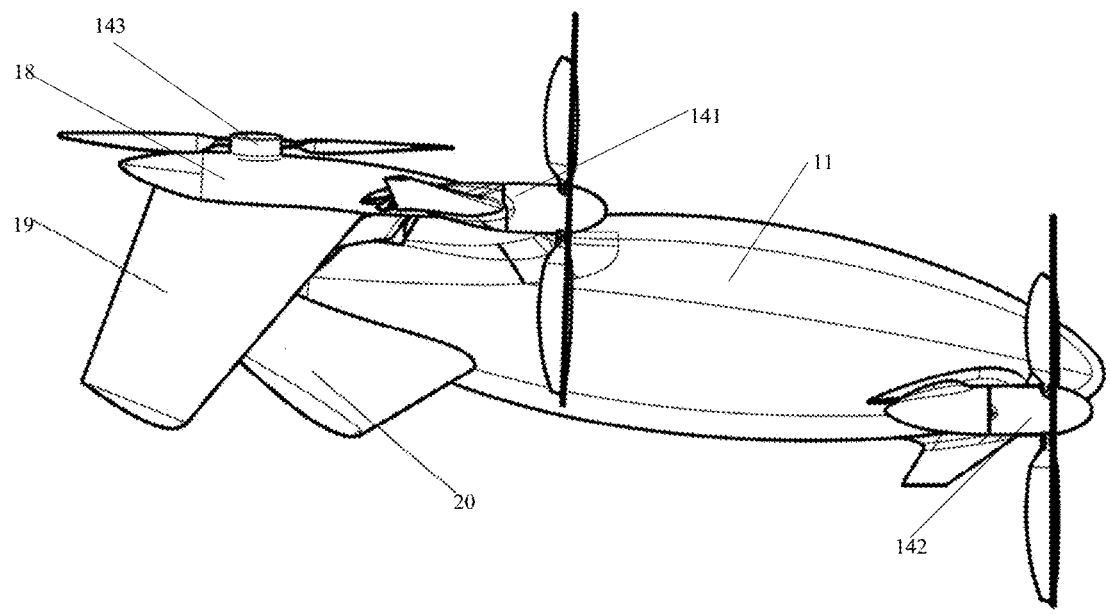
FIG. 12 is another left view of an aircraft in a level flight state according to some embodiments of the present disclosure.

The third rotor assemblies 143 may be connected to the main wings 12 through a nacelle structure, or the third rotor assemblies 143 may be connected to the main wings 12 through a tail boom 18. For example, as shown in FIG. 12, a vertical tail 19 is provided at the tail boom 18 to increase the stability of the heading. For example, the vertical fin 19 may be provided with a rudder to increase the heading control capability.

The propeller disk plane of the third rotor assembly 143 and the propeller disk plane of the second rotor assembly 142 may be substantially symmetrical along the direction of the aircraft 10.

In some embodiments of the present disclosure, when the aircraft 10 is in the vertical take-off/landing state or the hovering state, the rotating speeds of the first rotor assemblies 141, the second rotor assemblies 142, and the third rotor assemblies 143, may be controlled according to the weight distribution of the aircraft 10, the shape of the vehicle body 11, etc., to make the vehicle body 11 maintain a horizontally stable state.

When the aircraft 10 is in the level flight state, the blades of the third rotor assemblies 143 may be stored in the cavity of the nacelle structure to avoid flight resistance caused by protrusion of the blades, and the airflow disturbance in forward flight may be smaller.

When the aircraft is in the level flight state, the first rotor assemblies may generate a forward pulling thrust, and a side of the propeller disk plane of the first rotor assembly 141 away from the vehicle body 11 at least partially overlaps with the projection of the wing tip of the main wings 12 on the normal plane S1 of the roll axis (R in the drawings).

When the aircraft 10 is in the hovering state, one or more of the first rotor assemblies 141, the second rotor assemblies 142 or the third rotor assemblies 143 may have an outward thrust component m along the pitch axis (P in the drawings) of the aircraft 10. Through this arrangement, the pulling thrust line of the multi-rotor assembly may have an outward tilting tendency to ensure that it has a considerable heading control torque in the hovering configuration to meet the maneuverability requirements.

When the aircraft 10 is in the hovering state, the angle a of one or more of the first rotor assemblies 141, the second rotor assemblies 142 or the third rotor assemblies 143 with respect to the pitch axis (P in the drawings) of the aircraft 10 may be larger than 0. Through this arrangement, the pulling thrust line of the multi-rotor assembly may have an outward tilting tendency to ensure that it has a considerable heading control torque in the hovering configuration to meet the maneuverability requirements.

When the aircraft 10 is in the hovering state, the propeller disk planes of one or more of the first rotor assemblies 141, the second rotor assemblies 142 or the third rotor assemblies 143 may tilt toward a direction away from the vehicle body along the pitch axis (P in the drawings) of the aircraft 10. Through this arrangement, the pulling thrust line of the multi-rotor assembly may have an outward tilting tendency to ensure that it has a considerable heading control torque in the hovering configuration to meet the maneuverability requirements.

The canards 13 may be provided with first flaps 131, and the first flaps 131 may be used to provide a pitch torque to the aircraft 10. When the aircraft 10 is in the first transition state between the hovering state and the level flight state, the first flaps 131 may be movable relative to the canards 13 to keep the aircraft 10 level.

The main wings 12 may be provided with ailerons 121, and the ailerons 121 are used to provide a rolling torque for the aircraft 10.

The main wings 12 may be provided with second flaps 122, and the second flaps 122 may be used to reduce the flight speed of the aircraft 10. Exemplarily, the second flaps 122 may include inner flaps 1221 and outer flaps 1222.

When the aircraft 10 is in the first transition state between the hovering state and the level flight state, the ailerons 121 may be movable relative to the main wings 12 to keep the aircraft 10 level.

In the first transition state, the third rotor assemblies 143 may still keep working, but as the flight speed gradually increases, their propulsion gradually decreases. As the speed of the first transition state increases, the aerodynamic pressure gradually increases, and the longitudinal and lateral control capabilities of the ailerons 121 and the first flaps 131 may gradually increase. The control weight of the ailerons 121 and the elevator flap may gradually be added in the control algorithm, to cooperate the thrust control of the three rotor assemblies to achieve aircraft state control that meets flight quality requirements. In the first transition state, the ailerons 121 may be responsible for generating the roll torque of the aircraft, and may be used to assist in generating the roll control torque, and may also offset the roll torque generated by the coupling of the output of the yaw control torque, thereby balancing the aircraft 10. In the first transition stage, the first flaps 131 may be responsible for generating the pitch torque of the aircraft. When their trailing edges are tilted upward, the lift propulsion generated by the canards 13 may be reduced to generate a nose-down torque. When their trailing edges are tilted downward, the lift propulsion generated by the canard 13 may be increased to generate a nose-up torque, thereby balancing the aircraft 10. For example, the additional control torque generated by the manipulation of the first flaps 131 may be used to assist the pitch control of the aircraft 10 in the first transition stage, and may also compensate for the insufficient nose-up torque generated by the tilting of the second rotor assemblies 142.

When the aircraft 10 is in the first transition state from the hovering state to the level flight state, the first rotor assemblies 141 and/or the second rotor assemblies 142 may provide forward pulling thrust for the aircraft 10 to increase the flight speed of the aircraft 10. When the flight speed is larger than the preset speed, it may be determined that the aircraft 10 enters the level flight state. When the aircraft 10 enters the level flight state, the pulling thrust lines of the first rotor assemblies 141 and the second rotor assemblies 142 may be parallel to the roll axis (R in the drawings) and the pitch axis (P in the drawings) of the unmanned aircraft.

When the aircraft 10 is in the second transition state from the level flight state to the hovering state, the first rotor assemblies 141 and/or the second rotor assemblies 142 may provide backward resistance for the aircraft 10 to reduce the flight speed of the aircraft 10.

The vehicle body 11 may be provided with a ventral fin 20 near the tail. In some embodiments, the ventral fin 20 may be rotatable relative to the vehicle body 11 to adapt to different flight states of the aircraft 10.

Figure 5:
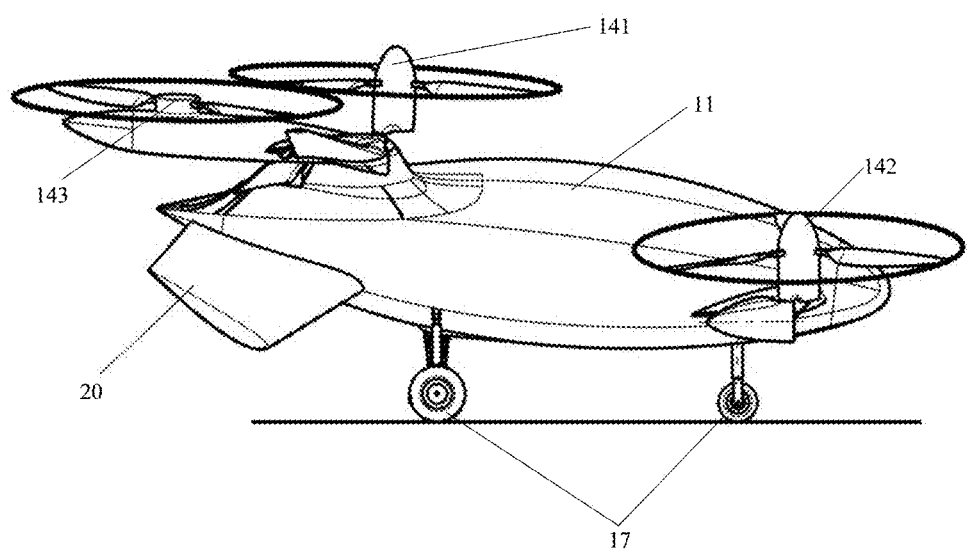
FIG. 5 is a left view of an aircraft in a hovering state or a take-off/landing state according to some embodiments of the present disclosure.

The vehicle body 11 may be provided with a landing gear 17 near the nose. The landing gear may be fixedly connected to the vehicle body 11. Or, as shown in FIG. 5, the landing gear may be movable relative to the vehicle body 11 and may be a retractable landing gear 17.

In some embodiments, when the aircraft 10 is not in flight, the ventral fin 20 may be in contact with the ground and form a layout of a three-point landing gear 17 with the landing gear 17.

In some embodiments, the aircraft 10 may further include a torque adjustment mechanism. The torque adjustment mechanism may be connected to the first rotor assemblies 141 and/or the second rotor assemblies 142, for adjusting pitch angles of the blades of the first rotor assemblies 141 and/or the second rotor assemblies 142.

Figure 10:
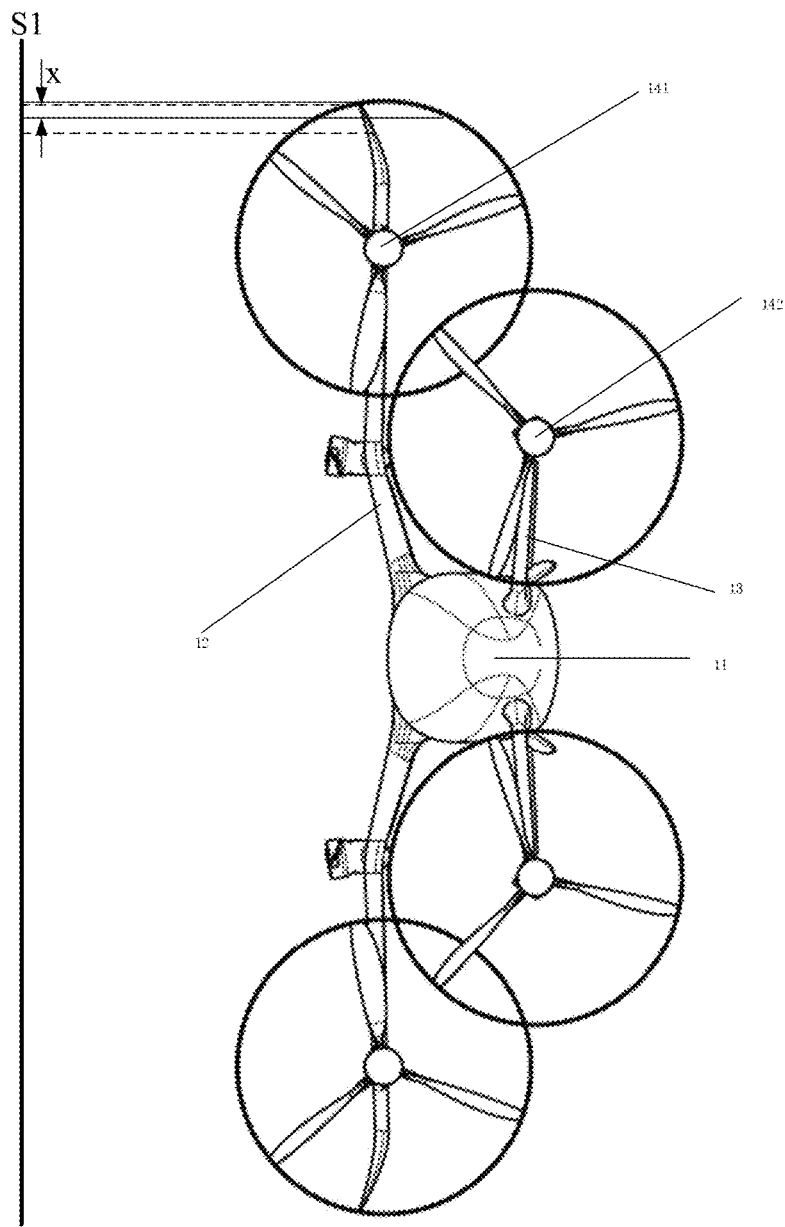
FIG. 10 is a front view of an aircraft in a level flight state according to some embodiments of the present disclosure.
Figure 11:
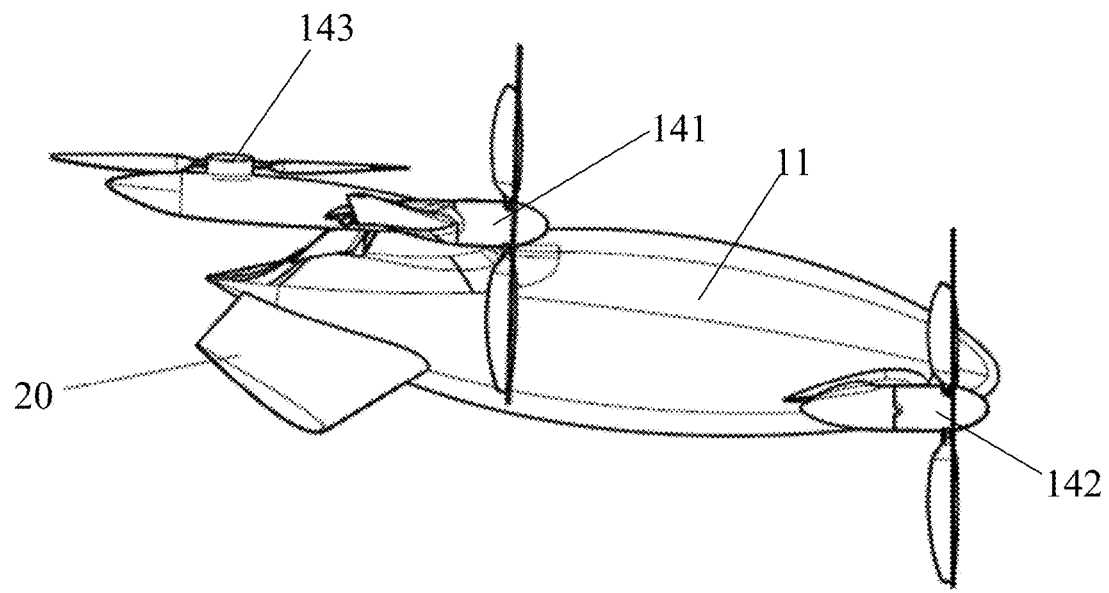
FIG. 11 is a left view of an aircraft in a level flight state according to some embodiments of the present disclosure.

The present disclosure also provides another aircraft 10 shown in FIG. 10. The aircraft 10 includes a vehicle body 11, main wings 12 fixedly connected to the vehicle body 11 and used to provide lift propulsion for the aircraft 10, and a multi-rotor assembly. The multi-rotor assembly includes first rotor assemblies 141. When the aircraft 10 is in the level flight state, the first rotor assemblies 141 may generate a forward pulling thrust, and a side of the propeller disk plane of the first rotor assembly 141 away from the vehicle body 11 may at least partially overlaps with the projection of the wing tips of the main wings 12 on the normal plane S1 of the roll axis (R in the drawings). As shown in FIG. 10, the overlapping part is x.

In some embodiments, the side of the propeller disk plane of the first rotor assembly 141 away from the vehicle body 11 may include a one-tenth part of the propeller disk plane away from the vehicle body 11. One wing tip of the main wings 12 may include a 100th part of the main wings 12 away from the vehicle body 11.

In some embodiments, when the aircraft 10 is in the level flight state, the first rotor assemblies 141 may generate the forward pulling thrust, and a farthest end of the propeller disk plane of the first rotor assembly 141 away from the vehicle body 11 may at least partially overlap with the projection of one corresponding wing tip of the main wings 12 on the normal plane S1 of the roll axis (R in the drawings).

Figure 3:
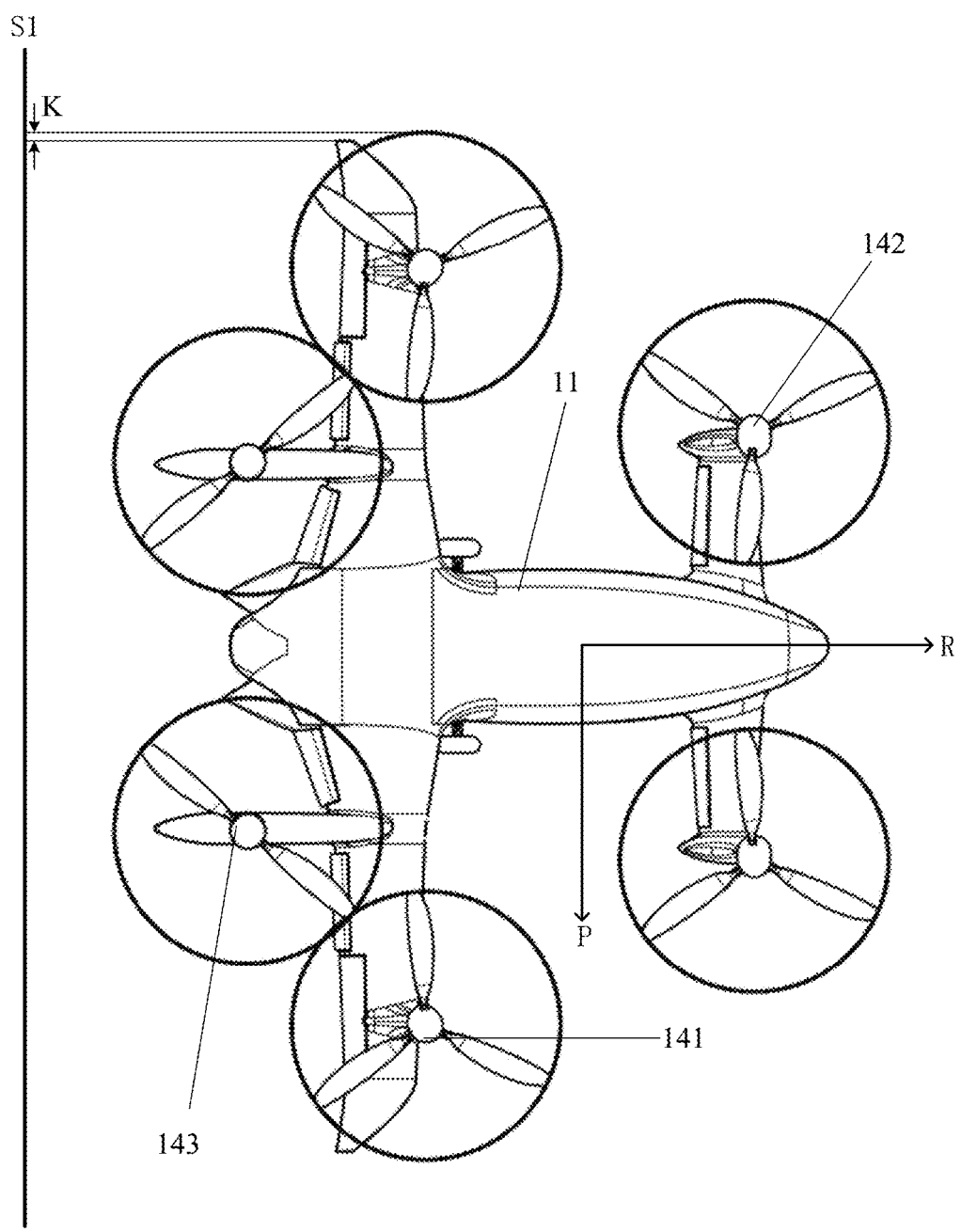
FIG. 3 is a top view of an aircraft in a hovering state or a take-off/landing state according to some embodiments of the present disclosure.
Figure 4:
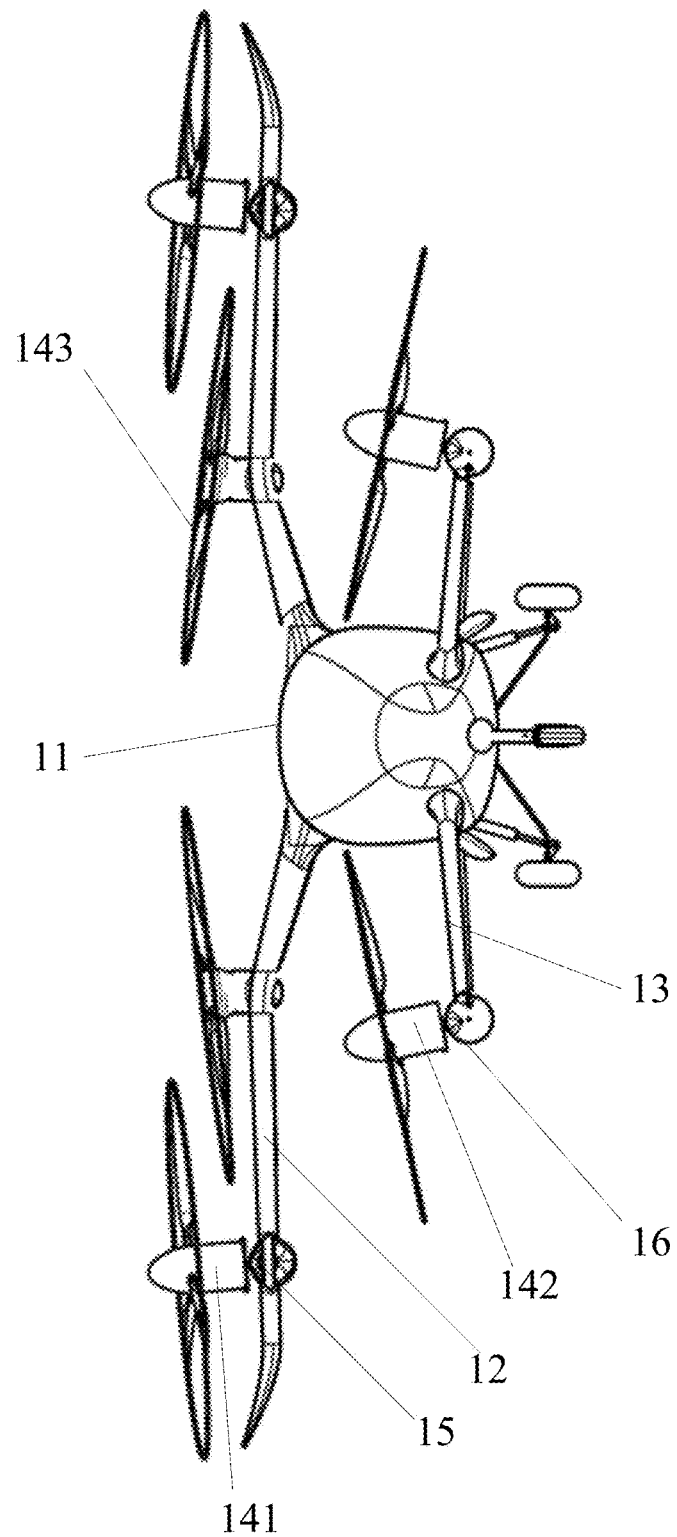
FIG. 4 is a front view of an aircraft in a hovering state or a take-off/landing state according to some embodiments of the present disclosure.

As shown in FIG. 3, in some embodiments, a distance K between the farthest end of the propeller disk plane of the first rotor assembly 141 away from the vehicle body 11 and the projection of a farthest end of the wing tip of the main wings 12 to the normal plane S1 of the roll axis (R in the drawings) is less than the preset distance. In some embodiments, the farthest end of the propeller disk plane of the first rotor assembly 141 away from the vehicle body 11 and the projection of the farthest end of the wing tip of the main wings 12 to the normal plane S1 of the roll axis (R in the drawings) may substantially overlap. The preset distance may be 0.01 of the length of the main wing.

In some embodiments, when the aircraft 10 is in the level flight state, the first rotor assemblies 141 may generate the forward pulling thrust, and there may be a certain moment during the rotation of the blades of the first rotor when the blade tips of the blades substantially overlap with the farthest ends of the wing tips away from the vehicle body.

Through the above settings, the aspect ratio may be increased and flight efficiency may be improved. In addition, the propeller tip vortex may be suppressed to improve the aerodynamic efficiency of the entire machine.

In some embodiments, the aircraft 10 may include a first tilting mechanism 15, and the first rotor assemblies 141 may be tiltably connected to the main wings 12 through the first tilting mechanism 15.

When the aircraft 10 is in the take-off state, the descending state or the hovering state, the propeller disk plane of the first rotor assembly 141 may be substantially parallel to the pitch axis (P in the drawings) of the aircraft 10.

When the aircraft 10 is in the level flight state, the propeller disk plane of the first rotor assembly 141 may be substantially perpendicular to the roll axis (R in the drawings) of the aircraft 10.

When the aircraft 10 is in the hovering state, the first rotor assemblies 141 may have an outward thrust component m along the pitch axis (P in the drawings) of the aircraft 10.

When the aircraft 10 is in the hovering state, the angle between the propeller disk plane of the first rotor assembly 141 and the pitch axis (P in the drawings) of the aircraft 10 may be larger than zero.

When the aircraft 10 is in the hovering state, one or more of the propeller disk plane of the first rotor assembly 141, the propeller disk plane of the second rotor assembly 142, or the propeller disk plane of the third rotor assembly 143 may be tilted away from the vehicle body along the pitch axis (P in the drawings) of the aircraft 10.

The main wings 12 may be provided with ailerons 121, and the ailerons 121 may be used to provide a rolling torque for the aircraft 10.

The main wings 12 may be provided with second flaps 122, and the second flaps 122 may be used to reduce the flight speed of the aircraft 10.

The vehicle body 11 may be provided with a ventral fin 20 near the tail. The ventral fin 20 may be rotatable relative to the vehicle body 11.

The aircraft 10 may further include a torque adjustment mechanism. The torque adjustment mechanism may be connected to the first rotor assemblies 141, for adjusting pitch angles of the blades of the first rotor assemblies 141 and/or the second rotor assemblies 142.

The present disclosure also provides a control method of an aircraft 10. The aircraft 10 includes a vehicle body 11; main wings 12 which are fixedly connected to the vehicle body 11 and are used to provide lift propulsion for the aircraft 10; canards 13 which are disposed at the vehicle body 11 close to the nose and used to provide lift propulsion for the aircraft 10, and a multi-rotor assembly including first rotor assemblies 141 and second rotor assemblies 142.

The first rotor assemblies 141 may be mechanically coupled to the main wings 12, and the second rotor assemblies 142 may be rotatably connected to the canards 13.

The control method may include: when the aircraft 10 is in the hovering state, the vertical takeoff state, or the vertical descending state, controlling the tilting angle of the second rotor assemblies 142 to be a preset upper limit angle of the tilting angle of the second rotor assemblies 142;

when the aircraft 10 is in the level flight state, controlling the tilting angle of the second rotor assemblies 142 to be a preset lower limit angle of the tilting angle of the second rotor assemblies 142.

The control method provided by the embodiments of the present disclosure may be applied to any aircraft 10 provided by any embodiments of the present disclosure.

When the aircraft 10 is in the hovering state, the vertical take-off state, or the vertical descending state, its attitude is as shown in the figures. In this state, the main pulling thrusts of the six rotors may be all upward to provide lift to maintain the hovering of the aircraft 10. During hovering for maneuvering and attitude control to resist external disturbances, the six rotors may be controlled by the flight control computer, to cooperate to output pulling thrust difference for generating the torque required for maneuvering. The rudder surface does not participate in the torque output required for maneuvering. In the embodiments of the present disclosure, the rudder surface may include the above-mentioned ailerons 121, the first flaps 131, and the second flaps 122.

The control method may include: controlling the movement of the second flaps 122 relative to the main wings 12 to increase the flight resistance of the aircraft 10, thereby reducing the flight speed of the aircraft.

For example, the first rotor assemblies 141 may be rotatably connected to the main wings 12. The method may further include:

When the aircraft 10 is in the hovering state, the vertical take-off state, or the vertical descending state, controlling the tilting angle of the second rotor assemblies 142 to be a preset upper limit angle of the tilting angle of the second rotor assemblies 142; and when the aircraft 10 is in the level flight state, controlling the tilting angle of the second rotor assemblies 142 to be a preset lower limit angle of the tilting angle of the second rotor assemblies 142.

For example, the method may further include:

when the aircraft 10 is in the first transition state from the hovering state to the level flight state, controlling the operating parameters of the first rotor assemblies 141 and/or the second rotor assemblies 142 to increase the flight speed of the aircraft 10.

Exemplarily, the method may further include:

when the aircraft 10 is in the second transition state from the level flight state to the hovering state, controlling the operating parameters of the first rotor assemblies 141 and/or the second rotor assemblies 142 to provide backward resistance for the aircraft 10 to reduce the flight speed of the aircraft 10.

For example, by reducing the rotation speed of the first rotor assemblies 141 and/or the second rotor assemblies 142, the forward pulling thrust may become less than the backward resistance, to reduce the flight speed of the aircraft 10. In another embodiment, the flight speed of the aircraft 10 may be reduced by reducing the tilting angle of the first rotor assemblies 141 and/or the second rotor assemblies 142 such that the forward pulling thrust is less than the backward resistance.

As shown in the drawings, the aircraft configurations in the second transition state may be similar to the aircraft configurations in the first transition state. The difference may be that the corresponding relationship between the flight speed and the tilting angle of the first rotor assemblies 141 and the second rotor assemblies 142 are different.

Exemplarily, the method may further include: controlling the operating parameters of the first rotor assemblies 141 and/or the second rotor assemblies 142 according to the current attitude and flight speed of the aircraft 10, to enable the aircraft 10 to fly stably.

The operating parameters of the first rotor assemblies 141 may include one or more of tilting angle, rotation speed, and attack angle of the blades; and the operating parameters of the second rotor assemblies 142 may include one or more of tilting angle, rotation speed, and attack angle of the blades.

Exemplarily, the method may further include: when the aircraft 10 transitions from the first flight state to the second flight state, controlling the tilting angle of the first rotor assemblies 141 and the tilting angle of the second rotor assemblies 142 to switch from an equal state to an unequal state.

Exemplarily, the method may further include: exemplarily, at one certain moment when the aircraft 10 has a horizontal forward flight speed, the difference between the tilting angle of the first rotor assemblies 141 and the tilting angle of the second rotor assemblies 142 is larger than zero.

The multi-rotor assembly may further include third rotor assemblies 143 connected to the vehicle body 11 or the main wings 12.

The method may include: when the aircraft 10 is in the level flight state, controlling the first rotor assemblies 141 to be in a stalled state.

Exemplarily, the canards 13 may be provided with first flaps 13. The method may further include: when the aircraft 10 is in the first transition state from the hovering state to the level flight state, according to the current flight state of the aircraft 10, controlling the first flaps 131 to move relative to the canard to keep the aircraft 10 level.

Exemplarily, the main wings 12 may be provided with ailerons 121. When the aircraft 10 is in the first transition state between the hovering state and the level flight state, the ailerons 121 may be controlled to move relative to the main wings 12, to keep the aircraft 10 level.

As shown in the drawings, in the first transition state, the first rotor assemblies 141 and the second rotor assemblies 142 may be controlled to tilt forward simultaneously to provide thrust for forward acceleration. The tilting angle of the first rotor assemblies 141 may be $0\_1$, and the tilting angle of the second rotor assemblies 142 may be $0\_2$. It can be clearly seen from the angle relationship in the figure that the tilting angle in the hovering state is 0 and the tilting angle in the level flight state is approximately 90 degrees. In the first transition state, the relationship between $0\_1$ and $0\_2$ may need to be determined according to the configuration of the aircraft 10 and the specific position coordinates of the motors, and it may be $0\_1 > 0\_2$, or $0\_1 = 0\_2$, or $0\_1 < 0\_2$. In the first transition state, the third rotor assemblies 143 may still keep working, but as the flight speed gradually increases, its thrust may gradually decrease. As the speed of the transition state increases, the aerodynamic pressure may gradually increase, and the longitudinal and lateral control capabilities of the ailerons 121 and elevator flaps may gradually increase. During the control, the control weights of the ailerons 121 and elevator flaps may gradually increase, to cooperate with the thrust control of the first rotor assemblies 141, the second rotor assemblies 142 and the third rotor assemblies 143 to achieve aircraft state control that meets flight quality requirements. In the first transition stage, the ailerons 121 may be responsible for generating the roll torque of the aircraft. It may be used to assist in generating the roll control torque, and may also offset the roll torque generated by the coupling of the output of the yaw control torque. In the first transition stage, the first flaps 131 may be responsible for generating the pitching torque of the aircraft. When its trailing edge is deflected upward, the lift thrust generated by the canards 13 may be reduced to generate a nose-down torque. When its trailing edge is deflected downward, the lift thrust of the canards 13 may be increased to produce head-up torque. The additional control torque generated by the manipulation of the first flaps 131 may be used to assist the pitch control of the aircraft in the transition stage, and may also make up for the lack of nose-up torque generated by the tilting of the first rotor assemblies 141.

Figure 13:
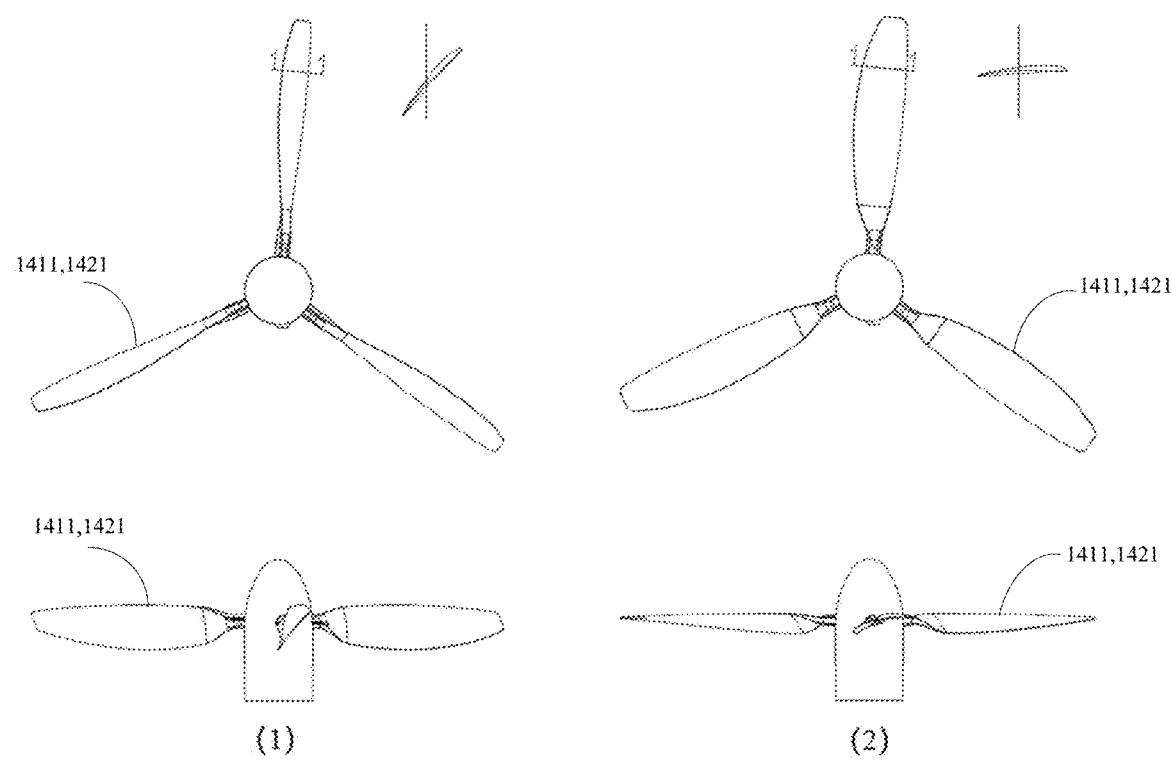
FIG. 13 is a view of propellers of an aircraft in a level flight state and a hovering state according to some embodiments of the present disclosure.

For example, according to the flight state of the aircraft 10, the pitch angle of the blades (1411, 1421) of the first rotor assemblies 141 and/or the second rotor assemblies 142 may be adjusted to adjust the pulling thrust through torque variation. In some embodiments, the torque and rotation speed may also be controlled simultaneously to adjust the pulling thrust. Part (1) of FIG. 13 shows the state of the blades (1411, 1421) in the level flight state, and part (2) of FIG. 13 shows the state of the blades (1411, 1421) in the hovering state.

In some embodiments, the rotation speed of each rotor member in the first rotor assemblies 141 and the second rotor assemblies 142 may also be controlled to generate a thrust difference, thereby controlling the flight attitude of the aircraft 10.

In the hovering state, the first flaps 131, the ailerons 121 and the second flaps 122 may be controlled to stop working. Only six rotor members may be used for attitude control, and other rudder surfaces may not participate in the torque output required by the aircraft 10.

Exemplarily, the vehicle body 11 of the aircraft 10 may be provided with a ventral fin 20 near the tail. When the aircraft 10 switches from the first flight state to the second flight state, the ventral fin 20 may be controlled to rotate relative to the vehicle body 11. For example, when the aircraft 10 transits from the first flight state to the second flight state, the ventral fin 20 may rotate relative to the vehicle body 11 to improve heading stability adaptability. For another example, when the aircraft 10 transitions from the hovering state to the vertical descending state, the ventral fin 20 may rotate relative to the vehicle body 11 to improve the stability of the aircraft 10. The difference between the first flight state and the second flight state may include one or more of a difference in flight speed, a difference in flight altitude, a difference in flight conditions, and a difference in flight attitude.

The present disclosure also provides a memory for storing executable instructions and one or more processors. When the one or more processors execute the executable instructions, the control method provided by previous embodiments of the present disclosure may be implemented.

The present disclosure also provides a computer-readable storage medium. The computer-readable storage medium may be used to store executable instructions. When the executable instructions are executed by a processor, the control method provided by previous embodiments of the present disclosure may be implemented.

What is claimed is:

1. An aircraft comprising:
   a vehicle body;
   a main wing, fixedly connected to the vehicle body and configured to provide lift thrust for the aircraft;
   a canard, arranged at the vehicle body near a nose and configured to provide lift thrust for the aircraft; and
   a multi-rotor assembly including:
     a first rotor assembly mechanically coupled with the main wing; and
     a second rotor assembly rotatably connected to the canard, and configured with an adjustable tilting angle relative to the canard to provide at least one of lift thrust or forward pulling thrust for the aircraft,
   wherein the first rotor assembly is configured such that when the aircraft is in a level flight state, the first rotor assembly is in a stalled state.

2. The aircraft according to claim 1, wherein:
   the first rotor assembly is rotatably connected to the main wing; and the first rotor assembly is configured to provide at least one of lift thrust or forward pulling thrust to the aircraft according to a tilting angle of the first rotor assembly.

3. The aircraft according to claim 1, wherein:
the main wing is disposed at the vehicle body near the tail, and a center of gravity of the vehicle body is located between the main wing and the canard.

4. The aircraft according to claim 1, wherein the first rotor assembly and the second rotor assembly are configured such that:
when the aircraft is in a take-off state, a descending state, or a hovering state, at least one of a propeller disk plane of the first rotor assembly or a propeller disk plane of the second rotor assembly is substantially parallel to a pitch axis of the aircraft; and
when the aircraft is in a level flight state, at least one of the propeller disk plane of the first rotor assembly is substantially perpendicular to a roll axis of the aircraft, and/or the propeller disk plane of the second rotor assembly is substantially parallel to the pitch axis of the aircraft.

5. The aircraft according to claim 1,
wherein the multi-rotor assembly further includes a third rotor assembly connected to the vehicle body or the main wing; and
wherein:
the third rotor assembly is fixedly installed on the main wing and located between the first rotor assembly and the vehicle body; or
the first rotor assembly is installed on a forward side of the main wing, and the third rotor assembly is installed on a rear side of the main wing.

6. The aircraft according to claim 5, wherein:
the third rotor assembly is configured such that when the aircraft is in a take-off state, a descending state, or a hovering state, a propeller disk plane of the third rotor assembly is parallel to the vehicle body and the third rotor assembly is in a working state.

7. The aircraft according to claim 6, wherein:
the third rotor assembly is further configured such that when the aircraft is in the level flight state, blades of the third rotor assembly extend along a direction of a roll axis of the aircraft.

8. The aircraft according to claim 5, wherein:
the third rotor assembly is connected to the main wing through a tail boom; and
a vertical tail is provided at the tail boom.

9. The aircraft according to claim 1, wherein
a side of a propeller disk plane of the first rotor assembly away from the vehicle body at least partially overlaps with a projection of a wing tip of the main wing on a normal plane of a roll axis of the aircraft.

10. The aircraft according to claim 1, wherein:
the multi-rotor assembly further includes a third rotor assembly connected to the vehicle body or the main wing; and
the first rotor assembly, the second rotor assembly, and the third rotor assembly are configured such that:
when the aircraft is in a hovering state, at least one of
an angle between a propeller disk plane of the first rotor assembly and a pitch axis of the aircraft, an angle between a propeller disk plane of the second rotor assembly and the pitch axis, or an angle between a propeller disk plane of the third rotor assembly and the pitch axis is larger than zero; or
when the aircraft is in the hovering state, at least one of the propeller disk plane of the first rotor assembly, the propeller disk plane of the second rotor assembly, or the propeller disk plane of the third rotor assembly is tilted away from the vehicle body along the pitch axis of the aircraft.

11. The aircraft according to claim 1, further comprising at least one of:
a first flap provided at the canard and configured to provide a pitch torque to the aircraft; or
a second flap provided at the main wing and configured to reduce a flight speed of the aircraft.

12. The aircraft according to claim 1, wherein the first rotor assembly and the second rotor assembly are configured such that:
when the aircraft is in a first transition state from a hovering state to a level flight state, at least one of the first rotor assembly or the second rotor assembly provides forward pulling thrust to the aircraft to increase a flight speed of the aircraft; and
when the aircraft is in a second transition state from the level flight state to the hovering state, at least one of the first rotor assembly or the second rotor assembly provides backward resistance to the aircraft to reduce the flight speed of the aircraft.

13. An aircraft comprising:
a vehicle body;
a main wing, fixedly connected to the vehicle body and configured to provide lift thrust for the aircraft;
a canard, arranged at the vehicle body near a nose and configured to provide lift thrust for the aircraft; and
a multi-rotor assembly including a first rotor assembly, a second rotor assembly rotatably connected to the canard and a third rotor assembly connected to the vehicle body or the main wing, the multi-rotor assembly being configured such that:
when the aircraft is in a level flight state, the first rotor assembly generates a forward pulling thrust, and a side of a propeller disk plane of the first rotor assembly away from the vehicle body at least partially overlaps with a projection of a wing tip of the main wing to a normal plane of a roll axis of the aircraft; and
when the aircraft is in the level flight state, the third rotor assembly is in a stalled state.

14. The aircraft according to claim 13, wherein:
a farthest end of the propeller disk plane of the first rotor assembly away from the vehicle body at least partially overlaps with the projection of the wing tip of the main wing to the normal plane of the roll axis of the aircraft;
a distance between the farthest end of the propeller disk plane of the first rotor assembly away from the vehicle body and a projection point of a farthest end of the wing tip of the main wing away from the vehicle body to the normal plane of the roll axis of the aircraft is less than the preset distance; or
at one or more moments during rotation of blades of the first rotor assembly, tips of the blades basically overlap with the farthest end of the wing tip away from the vehicle body.

15. The aircraft according to claim 13, wherein:
the first rotor assembly is rotatably connected to the main wing and configured to provide at least one of lift thrust or forward pulling thrust to the aircraft according to a tilting angle of the first rotor assembly.

16. The aircraft according to claim 15, further comprising:
a tilting mechanism;
wherein the first rotor assembly is tiltably connected to the main wing through the tilting mechanism.

17. The aircraft according to claim 13, wherein the first rotor assembly is configured such that:

when the aircraft is in a take-off state, a descending state, or a hovering state, a propeller disk plane of the first rotor assembly is substantially parallel to a pitch axis of the aircraft; or when the aircraft is in a level flight state, the propeller disk plane of the first rotor assembly is substantially perpendicular to the roll axis of the aircraft.

18. The aircraft according to claim 13, wherein the first rotor assembly is configured such that:

when the aircraft is in a hovering state, the first rotor assembly produces an outward thrust component along a pitch axis of the aircraft; or when the aircraft is in the hovering state, an angle between a propeller disk plane of the first rotor assembly and a pitch axis of the aircraft is larger than zero.

19. The aircraft according to claim 13, wherein the first rotor assembly, the second rotor assembly, and the third rotor assembly are configured such that when the aircraft is in a hovering state, at least one of a propeller disk plane of the first rotor assembly, a propeller disk plane of the second rotor assembly, or a propeller disk plane of the third rotor assembly is tilted away from the vehicle body along a pitch axis of the aircraft.

* * * * *